United States Patent

Russell

[15] 3,701,974

[45] Oct. 31, 1972

[54] LEARNING CIRCUIT

[72] Inventor: Lewis Keith Russell, San Jose, Calif.

[73] Assignee: Signetics Corporation, Sunnyvale, Calif.

[22] Filed: May 20, 1971

[21] Appl. No.: 145,213

[52] U.S. Cl. ..........................340/172.5, 340/347 DA

[51] Int. Cl. ..............................................G05b 13/00

[58] Field of Search ..................340/172.5, 347; 35/9

[56] References Cited

UNITED STATES PATENTS

| | | | |
|---|---|---|---|
| 3,591,778 | 7/1971 | Barron | 340/172.5 |
| 3,602,288 | 8/1971 | Nishiyama et al. | 340/172.5 |
| 3,601,811 | 8/1971 | Yoshino | 340/172.5 |
| 3,408,627 | 10/1968 | Kettler et al. | 340/172.5 |
| 3,573,448 | 4/1971 | Valentine | 340/347 DA |
| 3,505,673 | 4/1970 | James | 340/347 DA |

*Primary Examiner*—Gareth D. Shaw
*Attorney*—Flehr, Hohbach, Test, Albritton & Herbert

[57] ABSTRACT

A learning circuit of the type adapted to converge on a desired output in response to solution control signals. A number generator is provided for producing digital circuit input signals according to a predetermined probability distribution. A digital to analog converter converts the digital input signals to discrete analog input currents. Another digital to analog converter is responsive to digital solution control signals for producing discrete analog solution control currents. A digital counter has a digital counting signal input and an output comprising a digital voltage counter state feedback signal proportional to the count in the counter. An additional digital to analog converter is provided for converting the digital counter state feedback signal to a discrete analog feedback current. The input current, the solution control current and the feedback current are summed at a current node. The current node has a sum current output for driving an analog to digital converter which converts the sum current output to a digital voltage output. The digital voltage output constitutes the circuit output and is also applied to the digital voltage counting input of the digital counter.

10 Claims, 7 Drawing Figures

INVENTOR
LEWIS K. RUSSELL
BY [signature]
ATTORNEYS

INVENTOR.
LEWIS K. RUSSELL

BY Fisher, Hohbach, West, Albritton & Herbert
ATTORNEYS

INVENTOR.
LEWIS K. RUSSELL
BY
Flehr, Hohbach, Test, Albritton & Herbert
ATTORNEYS

LEARNING CIRCUIT

BACKGROUND OF THE INVENTION

This invention pertains to a learning circuit and more particularly pertains to a learning circuit compatible with digital equipment.

The present generation of computers are what may be termed programmable machines. That is, they are programmed by man to do a definite task. The programmer has to specify exactly what it is the computer is to do. This is a definite shortcoming of programmable machines in that oftentimes it is not known exactly what a computer must do in order to solve a problem. Further, as computers and the tasks assigned to them both grow more complex, it takes a large amount of time and trouble to specify or program every internal state of the computer exactly.

The frontiers of the computer art are therefore advancing in a direction of trainable, as opposed to programmable machines. With a trainable machine a computer is still taught to do a job by a "programmer" but not with the use of hard and fast programming language. In the case of trainable or learning machines, decision rules are learned by the machine through trial and error rather than having been specified beforehand by the designer. The decision rules are formulated on the spot to satisfy some optimization criteria. Such trainable machines necessitate circuitry that will form a habit; that is, the machines can either be trained in a certain direction or retrained in an opposite direction. The "programmer" interacts with the machine to reward it if it gets the right answer or penalize it if it gets the wrong answer and the machine changes its decision rules accordingly.

The prior art does contain some circuits which may be characterized as learning circuits. For example, some such learning circuits are described in an article entitled "Trainable Machines" by C.E. Hendrix appearing on page 24 of Research/Development magazine for November, 1970. The general rule with respect to such learning circuits is that they are analog circuits and therefore not very compatible with digital machines.

SUMMARY OF THE INVENTION

Accordingly, it is an object to this invention to provide a learning circuit for use in trainable computers and which is compatible with digital machines. Another object of the invention is to provide an improved circuit which exhibits learning and utilizes current voting at a junction.

Briefly, in accordance with one embodiment of the invention, a learning circuit is provided of the type adapted to converge on a desired digital output in response to solution control or reward and punishment signals. The learning circuit includes a number generator for producing digital circuit input signals according to a predetermined probability distribution. A digital to analog converter converts the digital circuit input signals to discrete analog input current. Another digital to analog converter is responsive to the digital solution control or reward and punishment signals for producing discrete analog solution control currents. A digital counter is provided having a digital voltage counting input and an output comprising a digital voltage counter state feedback signal. An additional digital to analog converter converts the digital voltage counter state feedback signal to discrete analog feedback currents. The input current, the solution control current and the feedback current are summed at a current node with the current node having a sum current output. An analog to digital converter is responsive to the direction or polarity of the sum current output for generating a digital voltage circuit output which forms the output of the learning circuit and which is also applied to the digital voltage counting input of the digital counter.

Additional objects and advantages of the invention will appear from the description of the preferred embodiments of the invention described in conjunction with the accompanying drawings.

DESCRIPTION OF THE PREFERRED EMBODIMENTS

Figure 1:
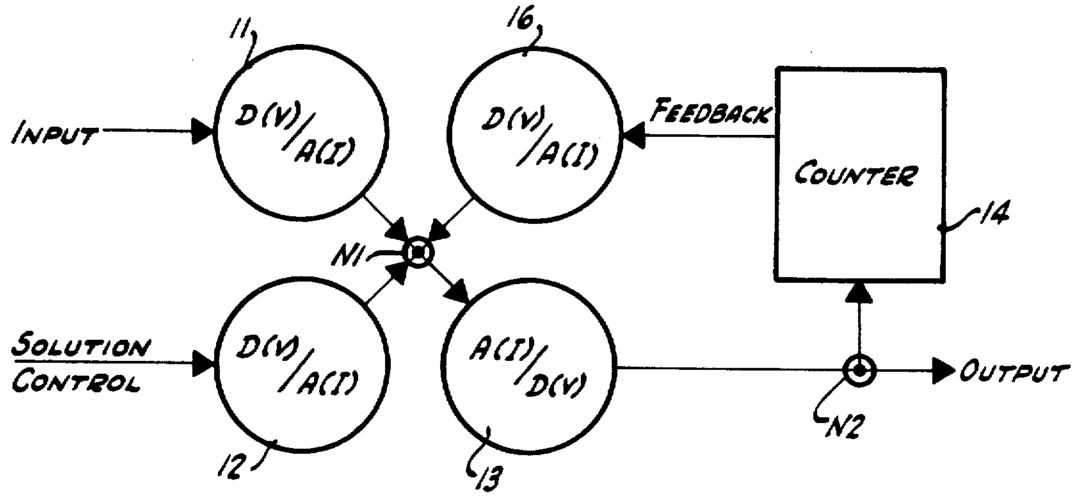
FIG. 1 is a generallized block diagram of a learning circuit in accordance with this invention.

A learning circuit in its most general form according to this invention comprises two types of digital to analog converters, a counting mechanism, a feedback loop and various control inputs. Referring to FIG. 1 a digital to analog converter 11 receives as an input randomly produced binary input numbers within a given range and based on a given probability distribution. This digital to analog converter then converts these binary numbers into a discrete current output within a range of discrete currents controlled by the range of possible input numbers. A solution control input is provided to a digital to analog converter 12 which produces strong override currents which are capable through the analog to digital converter 13 of changing the numbers stored in a counter 14. A feedback digital to analog converter 16 is provided for producing a discrete feedback current proportional to the number stored in the counter 14. The three currents from the three digital to analogue converters 11, 12 and 16 which are respectively the input current, the solution control override current and the feedback current, are summed at a current node N1. Applying Kirchoff's network laws, any current imbalance must be made up by a current source or current sink in the analog to digital converter 13. Thus, if the input current flows into the analog to digital converter 13, a positive voltage occurs at the output at node N2. If, on the other hand, current flows away from the analog to digital converter 13 a negative voltage output occurs at the node N2. Positive outputs at node N2 are capable of increasing the count held in the counter 14 while negative output pulses at the node N2 decrease the count in the counter 14 (or vice-versa, of course). The feedback loop comprising the analog to digital converter 13, the counter 14 and the digital to analog converter 16 tends to thus influence the effectiveness of currents coming from the input digital to analog converter 11. The circuit is said to have formed a habit when the count in counter 14 has deviated significantly from the neutral or unbiased position. Wrong habits may be corrected by the use of strong override or solution control currents produced by the solution control digital to analog converter 12.

Figure 2:
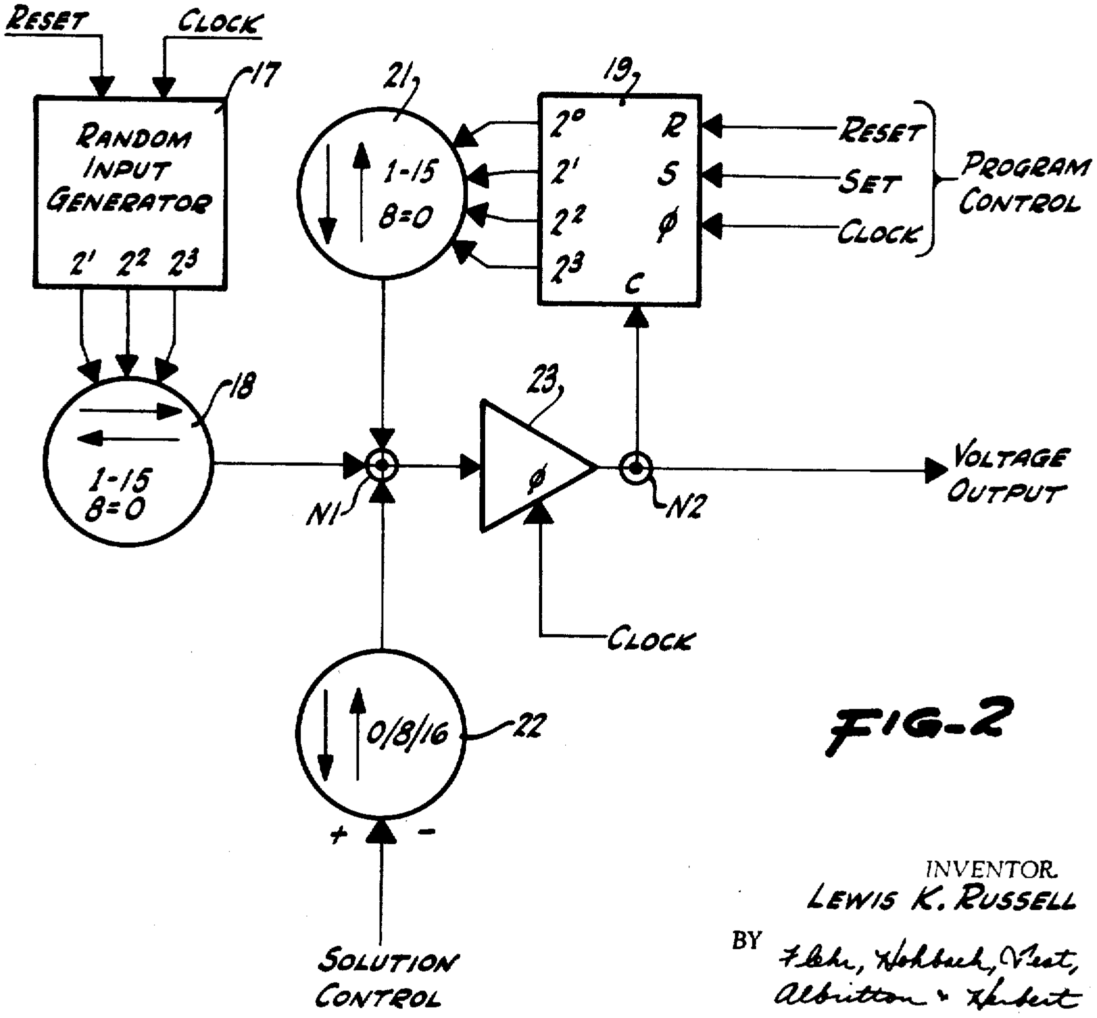
FIG. 2 is a block diagram of a specific learning circuit in accordance with this invention.
Figure 3:
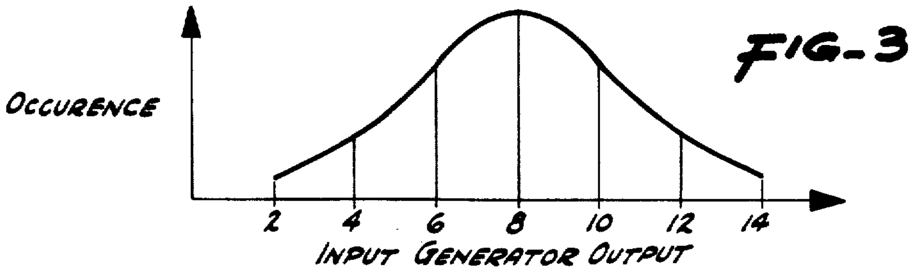
FIG. 3 is a graph showing one example of a probability distribution function utilized in generating numbers from the random input generator of FIG. 2.

Referring now to FIG. 2, there is shown a block diagram of a learning circuit in accordance with this invention and according to one embodiment thereof. A random input generator 17 is provided and has reset and clock inputs from, for example, program control of a computer. The random input generator 17 produces even numbered binary output signals from 2 to 14. The frequency of occurrence of a given output number is determined by a Gaussian or other similar probability distribution. Assuming that the random input generator 17 has a Gaussian probability distribution, a plot of number of occurrences of various input generator outputs is given in FIG. 3. Thus the output of the random output generator is a three digit binary number which is an even numbered output between 2 and 14. This binary number forms the input to a digital to analog converter 18. The digital to analog converter 18 converts this binary number to a discrete current output at a current summing node N1. The digital to analog converter 18 has a range of from 1 to 15 with 8 being set equal to zero current output. Thus, for each input number above 8 a positive increment of current is provided and for each input number having a value less than 8 succeeding negative increments of current are provided.

A counter 19 is provided which is capable of counting both up and down between 1 and 15. When counting down the counter holds at 1 even though additional negative pulses arrive. Similarly, when counting up the counter 19 holds at 15 even though additional positive pulses arrive. The counter 19 has an input C which accepts both positive and negative pulses with the positive pulses causing the counter to count up and negative pulses causing the counter to count down. The counter 19 also has input R which is a reset input, input S which is a set input and also a clock input, all from for example, program control of a computer. The set and reset inputs produce the effect shown by the following table:

| S | R | EFFECT |
|---|---|---|
| 0 | 0 | Accept count pulses |
| 0 | 1 | Set counter to 8 |
| 1 | 0 | Set counter to 15 |
| 1 | 1 | Set counter to 1 |

Figure 4:
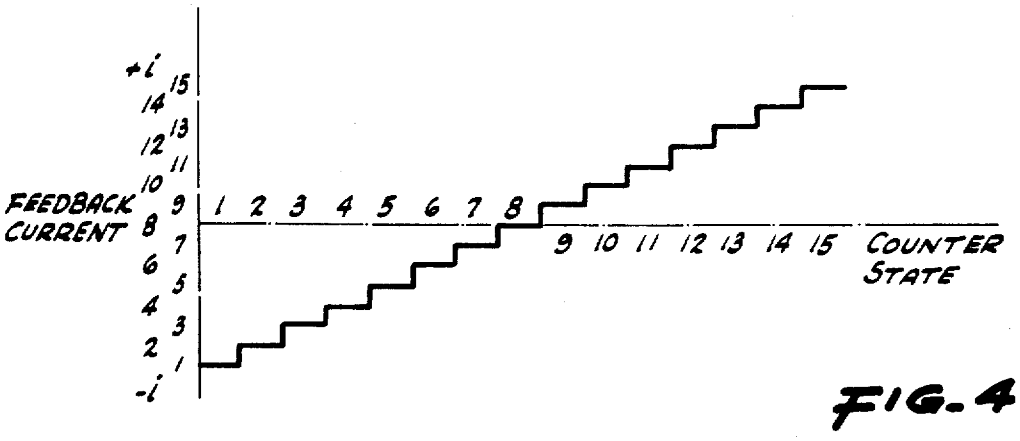
FIG. 4 is a graph illustrating the relationship between feedback current and the counter state of the counter shown in FIG. 2.

Thus, the counter 19 has four outputs on which appear a digital binary representation of the state of the counter. These four output lines form the input to a digital to analog converter 21. The digital to analog converter 21 is similar to the digital to analog converter 18. That is, the digital voltage inputs to it are converted into discrete analog output currents with the level of the output current proportional to the digital input number. As was the case with the digital to analog converter 18, 8 is set equal to zero with positive increments of current provided for numbers 9 through 15 and negative increments of current provided for numbers 7 through 1. FIG. 4 is a graph illustrating the feedback current output of the digital to analog converter 21 as a function of the counter state or count in the counter 19. The feedback current output of the digital to analog converter 21 forms an input to the current summing node N1.

An additional digital to analog converter 22 is provided which is responsive to s digital voltage solution control signal for producing a discrete solution control current output at the current summing node N1. The digital to analog converter 22 is basically a current generator similar to digital to analog converters 18 and 21 except that the digital to analog converter 22 produces only three discrete levels of current. These three levels are maximum source current, no current, or maximum sink current. These three levels compare to the discrete current output levels of the current generators or digital to analog converters 18 and 21 in that a 0 output from the current generator or digital to analog converter 22 is a stronger sink current than the 1 level of current generators 18 and 21. Likewise, the 16 level current output of the current generator 22 is a stronger source current than the 15 level of the current generators 18 and 21. Level 8 output from the current generator 22 is zero current output. These three current levels may be controlled by solution control input pulses where −V corresponds to level 0, +V corresponds to level 16 and 0 volts corresponds to level 8.

The current summing node N1 has a sum current output which forms the input to an analog to digital converter 23. The analog to digital converter 23 senses current flow to and away from its input, which is the current node N1, and converts this current flow toward or away from its input into a positive or a negative voltage at its output terminal node N2. Zero current at the input to the analog to digital voltage converter 23 is converted to a zero voltage output. The current level at the input to the analog to digital converter 23 is immaterial in that only the direction of current flow is sensed. The analog to digital converter 23 also has a clock input from, for example, program control of a computer.

Figure 5:
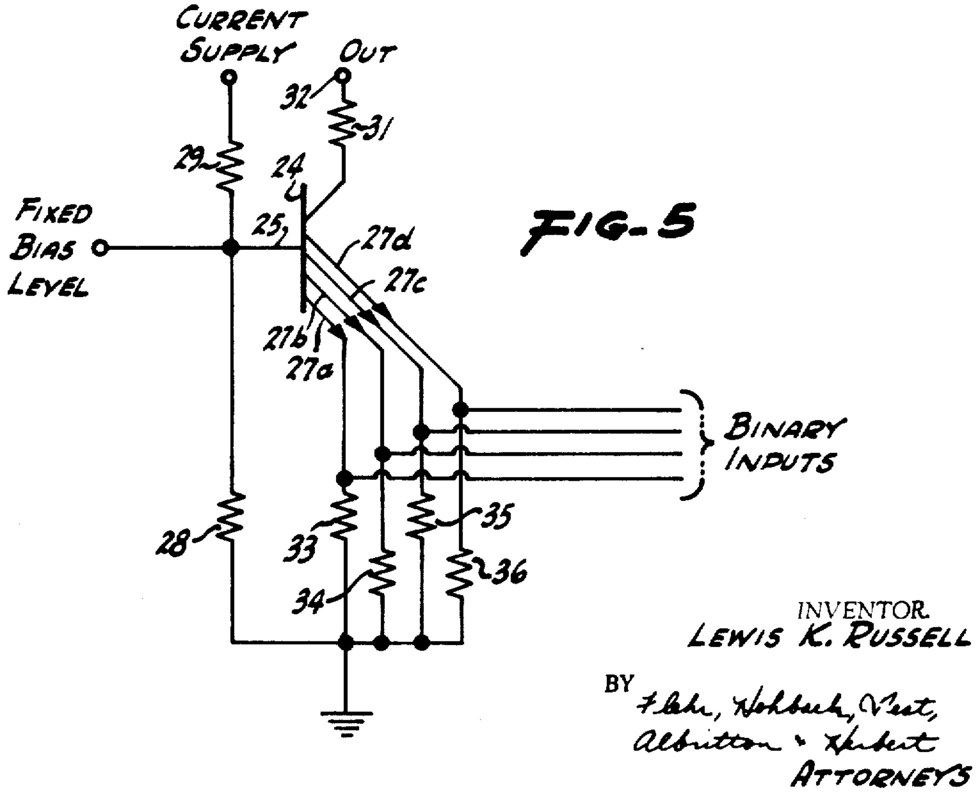
FIG. 5 is a detailed circuit diagram of a digital to analog converter which may be utilized in the learning circuits of FIGS. 2 and 6.

Suitable circuitry for the random input generator 17 and the counter 19 are well known in the art and are not discussed herein. Referring to FIG. 5 there is shown a suitable digital to analog converter or current generator which may be utilized for the digital to analog converters 18, 21 and 22. The digital to analog converter generally comprises a multi-emitter transistor 24 having a base electrode 25, a collector electrode 26 and multiple emitter electrodes **27*a* through *d*. The base electrode 25 is maintained at a fixed bias level and is connected through a resistor 28 to ground and through a resistor 29 to a source of current supply. The collector electrode 26 is connected through a resistor 31 to an output terminal 32 which constitutes the output terminal for the digital to analog converter or current generator. The multiple emitters of the transistor 24 indicated by reference numerals 27***a* through 27*d* are respectively connected through resistors 33, 34, 35 and 36 to ground and to binary inputs which may be, for example, the outputs of the counter 19 in FIG. 2. The resistors 33 through 36 are selected to have values having a relationship with respect to each other in accordance with powers of 2. Thus, resistor 33 has a value proportional to $2^0$, resistor 34 proportional to $2^1$, resistor 35 proportional t0 $2^2$ and resistor 36 proportional to $2^3$. The binary inputs provide biasing for the emitters of transistor 24 such as that when a voltage appears on one of the binary inputs the emitter to which that binary input is connected conducts, with the amount of emitter current proportional to the value of the one of the resistors 33 through 36 in that respective emitter circuit. Thus, the total collector current at the output terminal 32 is proportional to the binary number input at the multiple emitter of transistor 24 so that the binary digital input is converted to an analog discrete current level output. Suitable circuits for the analog to digital converter 23 are also well known in the art. A suitable circuit is also shown in a copending application entitled High Speed Logic Circuit with Low Effective Capacitance, Miller U.S. Pat. No. 3,668,430, issued June 6, 1972, and assigned to the assignee of the present invention.

To begin a discussion of circuit operation, let it be assumed that the counter 19 is reset to 8. The feedback current generator 21 controlled by the counter 19 thus produces a zero feedback current. Every input number of 8 from the random input generator 17 produces zero current output from the input generator. Initially, there is no information coming from the solution control section of the computer so that the current generator 22 will also supply 0 current. The sum of these three currents at the summing node N1 is 0. The analog to digital converter 23 having a 0 current input also has an output of 0 volts. The 0 voltage output of the analog to digital converter 23 being fed by a node N2 into the counter input of the counter 19 does not change the 8 originally set in the counter 19.

Next, suppose a random number 10 is produced by the random input generator 17, with the current generators 21 and 22 remaining as before. There will be two units of positive current flowing into the analog to digital converter 23 and a positive digital voltage output appears at the output node N2. The counter 19 then counts up one unit to a value of 9. The feedback current generator 21 then produces one unit of current. Suppose that the random input generator 17 next generates a number 6 so that the digital to analog current generator 18 sinks two units of current. With no signal coming from the solution control section of the computer, the solution control digital to analog current generator 22 still generates 0 current. Solution of Kirchoff's current law at node N1 demands a negative current input for the analog to digital converter 23, i.e., it must source one unit of current to the node N1. This sourcing of one unit of current produces a negative voltage pulse at the node N2 which counts the counter 19 back down from 9 to 8 so that the net effect of a positive input to the counter 19 followed by a negative input to the counter 19 is 0.

Now, however, assume that the second random number is 8 instead of 6 so that the sequence is 8, 10, 8. For this case the counter 19 is advanced to 10 since the feedback digital to analog current generator 21 is still producing a one level current feedback. Thus, the net result of the 8, 10, 8 input sequence from the random input generator 17 is two successive units of current sourced from the feedback digital to analog current generator 21. Thus, the counter is now set to 10. At this point, from the input viewpoint the effectiveness of the random numbers being generated by the random input generator 17 has changed. Now an input random number of 4 or 2 is required to count down, a 6 maintains the status quo and 8 or above counts up. For example, suppose the fourth random number is 4. The digital to analog current generator 18 will thus sink four units of current while the feedback digital to analog current generator 21 is sourcing two units of current. The analog to digital converter 23 thus generates a negative voltage pulse which counts the counter back down to 9. Thus, the sequence 8, 10, 8, 4 leaves the counter at 9. The counter 19 after an 8, 10, 8, 4 sequence has built a two unit positive habit but with a single negative input has only unlearned part of this habit, having a remaining one unit positive habit. At this point, however, it takes less effort to unlearn the remaining habit in that an input of 6 is now effective to count the counter 19 back down to 8. Thus, the sequence 8, 10, 8, 4, 6 brings the counter through the following sequence: 8/8, 9, 10, 9, 8 (the initial 8 before the / signifying that the counter was initially at 8).

Suppose now that at the end of the sequence 8, 10,8 it is discovered that the answer the computer (which comprises a plurality of learning circuits) is beginning to arrive at is diverging from the neighborhood of the desired response. At this point the built up habit of the learning circuit can be changed by a signal from the solution control section of the computer. This signal can either be generated by the computer itself having reference to optimization values, or by a computer operator or "programmer". A positive solution control pulse applied to the digital to analog converter or current generator 22 produces a strong source current corresponding to the current value for the number 16 which is large enough to override any currents produced by the feedback digital to analog converter or current generator 21 or the input digital to analog converter or current generator 18 so that the output to the analog to digital converter 23 is a positive voltage which counts the counter 19 up. If desired, the solution control signal can be applied to the digital to analog converter or current generator 22 throughout many clock pulses to that the counter 19 is counted up several steps. In a similar fashion, a negative pulse from the solution control section produces a strong sinking current output from current generator 22 which overrides the current outputs from the current generators 18 and 21 to produce a negative output voltage at the node N2 so that the counter 19 is counted down. In this manner by utilizing signals from the digital to analog converter or current generator 22 the counter 19 is eventually driven to either the top or bottom of its range to form a hard habit so that either positive voltage pulses or negative voltage pulses will always be produced at the node N2.

Figure 6:
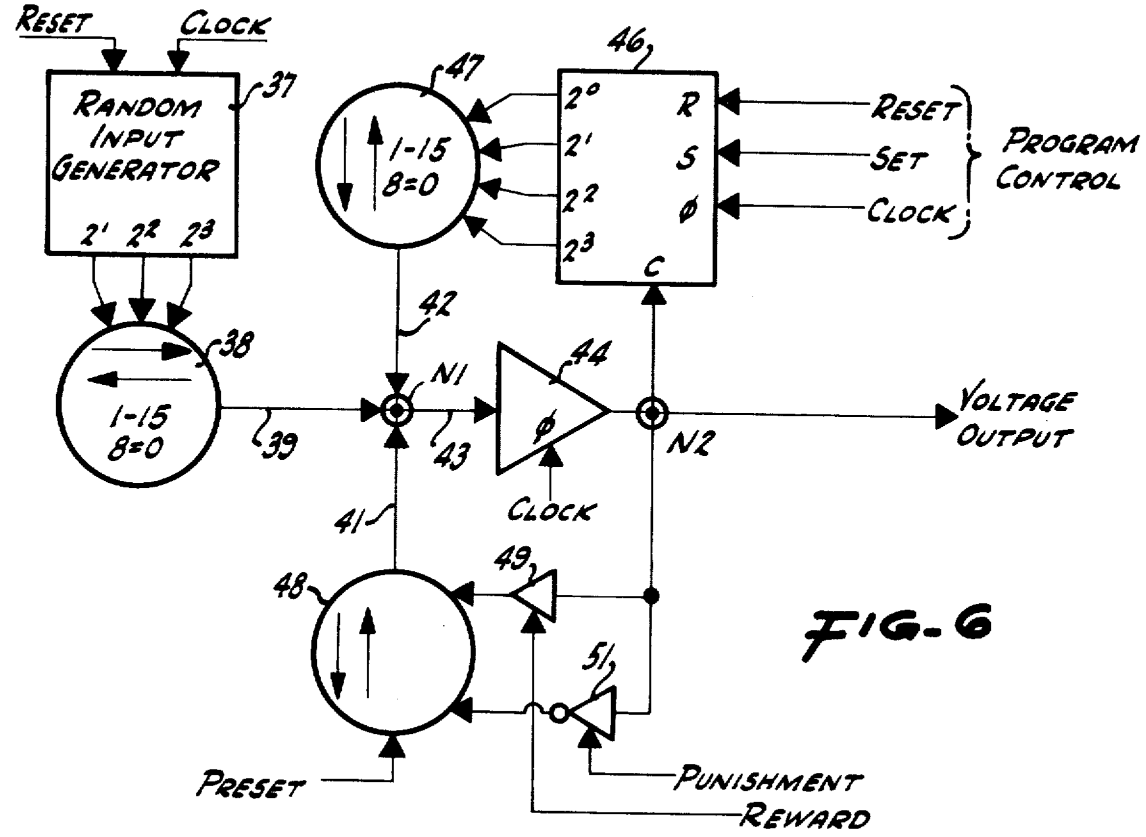
FIG. 6 is a block diagram of another embodiment of the learning circuit similar to that shown in FIG. 2 but having different punishment and reward circuitry.

Referring now to FIG. 6, there is shown another embodiment of the invention. In the embodiment of FIG. 6 a random input generator 37 generates even binary numbers between 2 and 14 according to a predetermined probability distribution. A digital to analog converter or current generator 38 transforms these binary numbers into discrete analog currents which are coupled to a current summing node N1 over a circuit 39. The current summing node N1 also has discrete analog current inputs 41 and 42 and a discrete analog current sum output over circuit 43 which is coupled to an analog digital converter 44. The analog to digital converter 44 senses the direction of current flow on circuit 43 and generates a voltage pulse responsive thereto with a polarity of the voltage pulse depending upon the direction of current flow along the circuit 43. This voltage is present at node N2 and forms a voltage output and forms a counting input C to a counter 46. The counter 46 is identical to the counter discussed in connection with the embodiment of FIG. 2 and drives a digital to analog converter or current generator 47 which produces a discrete feed back current present on the circuit 42. A reward and punishment arrangement is incorporated in the embodiment of FIG. 6 and comprises a digital to analog converter or current generator 48, a unit amplifier 49 and a unit inverter 51. The unit amplifier 49 and the unit inverter 51 examine the polarity of the voltage signals at the node N2. If a reward is desired, the polarity of the voltage at N2 is locked into the unit amplifier 49 by enabling unit 49 through a reward signal applied thereto. The output voltage of the unit amplifier 49 forms an input to another digital to analog converter or current generator 48 which converts it into a discrete current level coupled over circuit 41 to the current summing node N1. For this case the current emanating from the current generator 48 is in such a direction as to drive the counter 46 further in the direction it has taken at this point.

In a similar manner, a punishment signal applied to the unit inverter 51 inverts the polarity of the voltage of the node N2 and locks this inverted voltage as an input into the solution control digital to analog converter or current generator 48 which causes the current on circuit 41 to be in such a direction that the counter 46 is driven opposite to the direction it has taken. As an example, suppose that after the sequence 8, 10, 8 it is discovered that the solution is diverging from the desired neighborhood. If the divergence is slight a unit punishment may be applied, dropping the counter from 10 to 9. Now an input of 6 is effective in lowering the counter state. Thus, an input of 8, 10, 8, punishment, 6 bring the counter back to 8. On the other hand, suppose that the third input of 8 made the solution converge rapidly toward the desired neighborhood of solution. A unit reward would drive the counter to 11. Two units of reward would drive it to 12. With the counter 46 at 12 only an input of 2 would be successful in lowering the count. The circuit would thus have developed a hard habit. It is now very likely that succeeding pulses will drive counter 46 to the top of its range which is 15. Only direct intervention from the solution control digital to analog converter 48 will now have any success in lowering the count since an input of 2 will have no effect on the count.

Once a correct solution is obtained for a given type problem utilizing learning circuits, the correct path through a computer may be stored in an associative memory. This is done by interrogating the state of all the N2 nodes of each learning circuit or branching decision point in the proper order, with the order being dictated by the decision reached at each point. A new problem may then be solved more rapidly than random trial and error by searching through an associative memory for previous solutions to similar problems, and then by hard wiring or presetting all branching decision points where the same choice must be made. The computer may be able to recognize the solution for parts of the problem and gain the rest of the solution by random means. Hard wiring or presetting can be accomplished via the solution control digital to analog converter or current generator 48 by using a preset input thereto directly from the solution control section of the computer. Various degrees of presetting may be selected by judging whether the given section of the current problem is vaguely similar or exactly like the closest problem selected by the associative memory.

Figure 7:
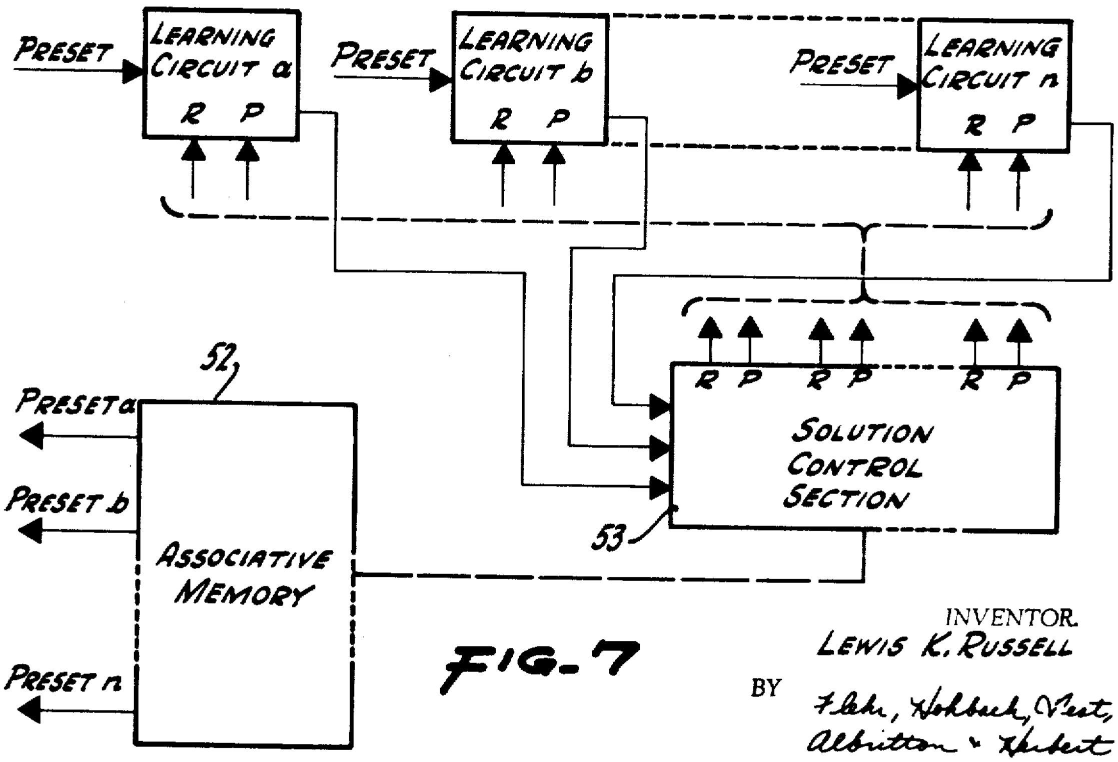
FIG. 7 is a block diagram of portions of a trainable computer utilizing a plurality of learning circuits and having an associative memory.

Thus, referring to FIG. 7, there is illustrated in generalized block diagram form various sections of a computer utilizing, for example, a plurality of the learning circuits as described in connection with FIGS. 2 or 6. Thus, a plurality of learning circuits *a*, *b*, through *n*, are provided. Each of the learning circuits has a preset input adapted to be coupled to and driven by an associative memory 52. The outputs of all the learning circuits, *a*, *b*, through *n*, are input to a solution control section of the computer 53. The solution control section 53 has reward and punishment outputs which form inputs to the learning circuits. The solution control section 53 is suitably coupled to the associative memory 52 for cooperating therewith to select presetting values in accordance with solutions to similar problems the learning circuits have solved in the past.

Thus, what has been described is an improved learning circuit compatible with digital equipment and adapted to be used in trainable machines.

I claim:

1. A learning circuit of the type adapted to converge on a desired digital voltage output comprising means for generating random binary input numbers, means for converting said binary input numbers into input currents, means for generating solution control override currents, means for generating feedback currents, means for summing said input current with said solution control override current and said feedback current to form a sum current, means responsive to the polarity of said sum current for generating an output voltage with the polarity of said output voltage dependent upon the polarity of said sum current, said means for generating a feedback current comprising a counter responsive to one polarity of said output voltage for counting up and to the opposite polarity of said output voltage for counting down, said counter having a predetermined range with upper and lower limits and having a binary counter state output, and means responsive to said binary counter state output for generating said input current whereby said counter converges on its upper or lower range so that said sum current and hence said voltage converges on one polarity.

2. A learning circuit of the type adapted to converge on a desired digital voltage circuit output in response to solution control signals comprising: a random input generator for producing digital circuit input signals according to a predetermined probability distribution, a first digital to analog converter for converting said digital input signals to a discrete analog input current, a second digital to analog converter responsive to the solution control signal for producing discrete analog solution control currents, a digital counter having a digital voltage counting feedback and an output comprising a digital binary counter state feedback signal, a third digital to analog converter for converting said counter state feedback signal to a discrete analog feedback current, a current node for summing said input current, said solution control current and said feedback current, said current node having a sum current output, and an analog to digital converter responsive to the polarity of the sum current output for generating a digital voltage circuit output, said digital voltage circuit output also being applied to said digital voltage counting input of said digital counter.

3. A learning circuit in accordance with claim 2 in which said digital counter counts up one unit for each application of a counting input of one polarity and counts down one unit for each application of a counting input of an opposite polarity.

4. A learning circuit in accordance with claim 3 in which said counter has a defined counter state range having upper and lower limits and wherein said counter converges on one of said upper and lower limits whereby additional counting inputs of said one polarity cease to affect said counter when said counter is at said upper limit and wherein counting inputs of said opposite polarity cease to affect said counter when said counter is at said lower limit.

5. A learning circuit in accordance with claim 2 in which said input signals to said first, second and third digital to analog converters are binary inputs each having multiple digits and wherein said first, second and third digital to analog converters each comprise a transistor having a base electrode, a collector electrode and multiple emitter electrodes, means for providing a fixed bias at said base electrode, each of said multiple emitter electrodes connected in series with a resistor having a predetermined value, the predetermined values of said resistor being related to each other according to powers of 2, said binary input having each of its digits respectively coupled to one of said multiple emitter electrodes with each of said binary digits operating to provide emitter biasing for enabling the emitter to which it is coupled whereby current is conducted through enabled emitters with the sum of the emitter currents and hence the collector current being a discrete current proportional to the binary number inputs.

6. A learning circuit in accordance with claim 2 wherein said random input generator is of the type adapted to produce binary signals corresponding to the numbers 2, 4, 6, 8, 10, 12 and 14, in accordance with a Gaussian occurrence probability with 8 being the median occurrence.

7. A learning circuit in accordance with claim 2 wherein said first, second and third digital to analog converters comprise current generators producing discrete analog output currents in response to binary inputs and wherein a current level of 0 corresponds to a binary input of 8 with binary inputs greater than 8 generating proportional levels of sourcing current and binary inputs of less than 8 generating proportional levels of sinking current.

8. A learning circuit in accordance with claim 2 wherein said second digital to analog converter is responsive to a solution control input of one polarity for generating a sourcing current larger than either said input current or said feedback current and responsive to a solution control input of an opposite polarity for generating a sinking current larger than either said input current or said feedback current.

9. A learning circuit of the type adapted to converge on a desired digital voltage output in response to reward and punishment signals comprising: a random input generator for producing digital circuit input signals according to a predetermined probability distribution, a first digital to analog converter for converting said digital input signals to discrete analog input currents, a second digital to analog converter responsive to the reward and punishment signals for producing reward and punishment currents, a digital counter having a digital voltage counting input and an output comprising a digital binary counter state feedback signal, a third digital to analog converter for converting said counter state feedback signal to a discrete analog feedback current, a current node for summing said input current with said reward and punishment current and said feedback current to form a sum current output, an analog to digital converter responsive to the polarity of said sum current output for generating a digital voltage output with the polarity of said voltage output corresponding to the polarity of said sum current output, said voltage output being applied to said digital voltage counting input of said digital counter, reward means comprising a unit amplifier actuated by a reward signal for coupling said voltage output to said second digital to analog converter, punishment means comprising a unit inverter actuated by a punishment signal for coupling the inverse of said voltage output to said second digital to analog converter, said second digital to analog converter responsive to said reward means for generating a reward current tending to increase the magnitude of said sum current output and responsive to said punishment means for generating a punishment current tending to decrease the magnitude of said sum current output.

10. A learning circuit in accordance with claim 9 wherein said second digital to analog converter has a preset input, said second digital to analog converter responsive to said preset input for generating a preset current which is summed with said input current and said feedback current by said current node and said preset current overriding said input current and feedback current to initially control the polarity of said sum current output and hence the polarity of said voltage output.

* * * * *